Aug. 1, 1967        J. H. MERCIER        3,333,600
HYDRAULIC PRESSURE VESSEL SYSTEM
Filed June 18, 1964        3 Sheets-Sheet 1

INVENTOR
JACQUES H. MERCIER
BY
ATTORNEYS

Aug. 1, 1967  J. H. MERCIER  3,333,600
HYDRAULIC PRESSURE VESSEL SYSTEM
Filed June 18, 1964  3 Sheets-Sheet 3
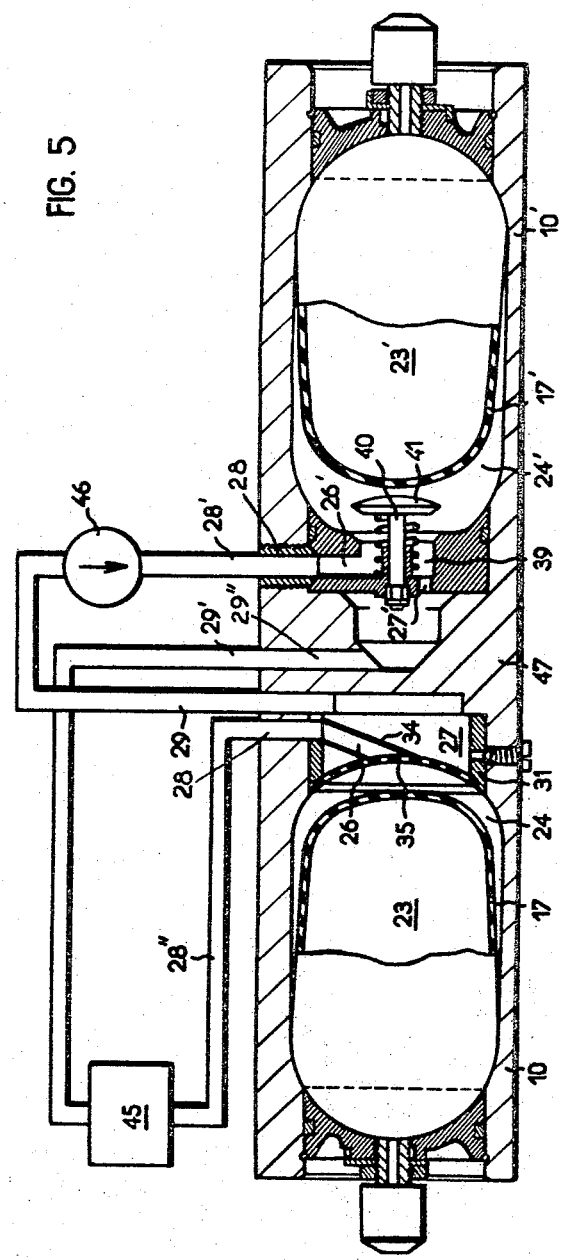
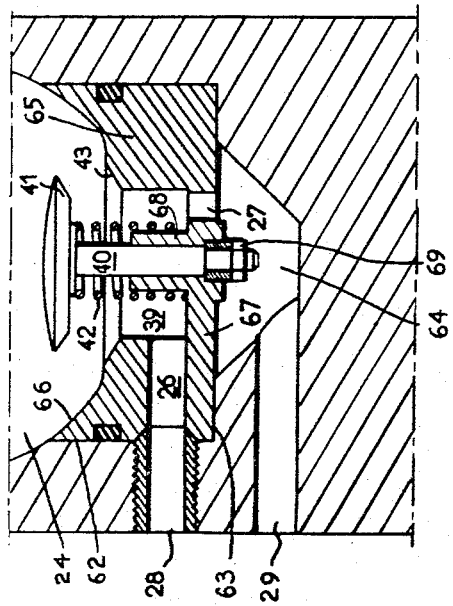
INVENTOR
JACQUES H. MERCIER
BY
Dean Fairbank & Hirsch
ATTORNEYS United States Patent Office 3,333,600
Patented Aug. 1, 1967

3,333,600
HYDRAULIC PRESSURE VESSEL SYSTEM
Jacques H. Mercier, New York, N.Y., assignor to Mercier Olaer Patent Corporation, Wilmington, Del., a corporation of Delaware
Filed June 18, 1964, Ser. No. 376,179
Claims priority, application France, July 4, 1963, 940,378
3 Claims. (Cl. 137—568)

This invention relates to the art of pressure vessels, more particularly of the type comprising a rigid container having a deformable and expansible partition intervening between the gas and liquid ports thereof and defining a gas and oil chamber on opposed sides thereof.

As conducive to an understanding of the invention, it is noted that to ready a pressure vessel of the above type for operation, the gas chamber is first charged with gas under pressure and thereupon the oil chamber is charged with oil under pressure. Where a single liquid port is provided for recharging of the pressure vessel with oil during operation and for discharging of oil therefrom into the hydraulic system to be actuated, when the pressure vessel is substantially emptied, due to the resultant drop in the pressure therein, the pump normally used to charge the oil chamber of the pressure vessel will then operate to force oil under pressure into the liquid port to recharge the pressure vessel.

As the oil is being forced out of the liquid port rapidly due to the expansion of the partition which generally is a bladder, even though oil will be forced into the liquid port by the pump under a greater pressure than exists in the pressure vessel, during such recharging period there will be oil flowing into and out of the liquid port at the same time.

As a result of the common liquid port, the oil moving rapidly in opposite direction will mix in the liquid port causing strong eddy currents and as a result, air bubbles may develop which will pass into the hydraulic system being actuated causing cavitation with resultant malfunctioning of the hydraulic system.

It is accordingly among the objects of the invention to provide a pressure vessel of the above type in which no eddy currents will be developed upon recharging of the pressure vessel while it is discharging oil into the hydraulic system to be actuated, thereby preventing cavitation in such hydraulic system.

According to the invention, these objects are accomplished by the arrangement and combination of elements hereinafter described and more particularly recited in the claims.

Figure 1:
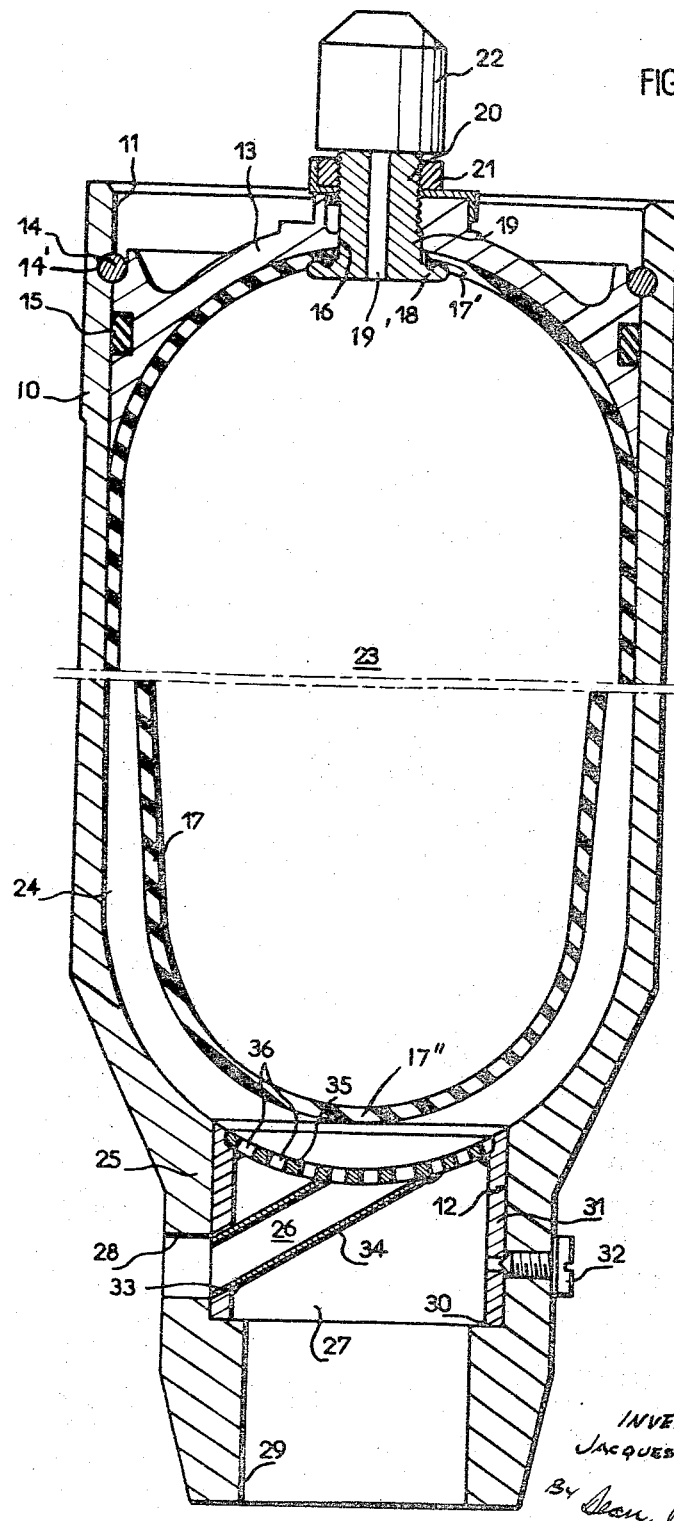
Figure 2:
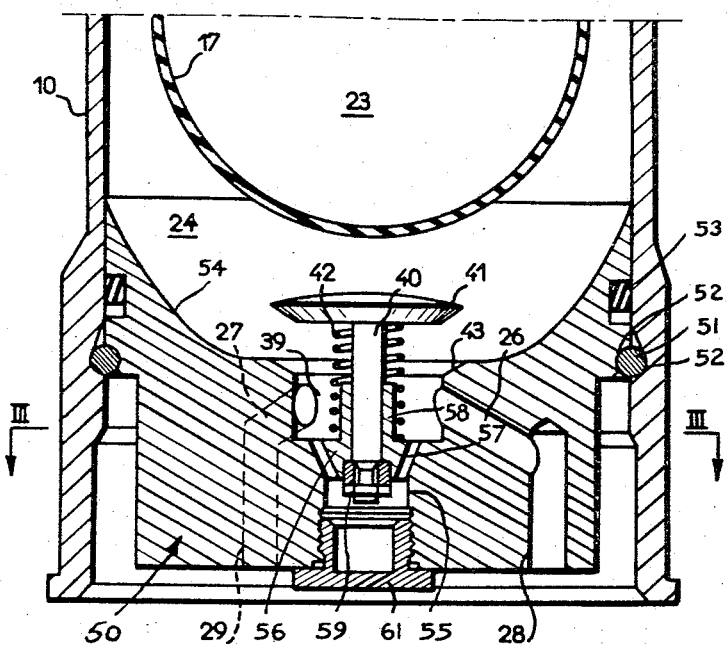
Figure 3:
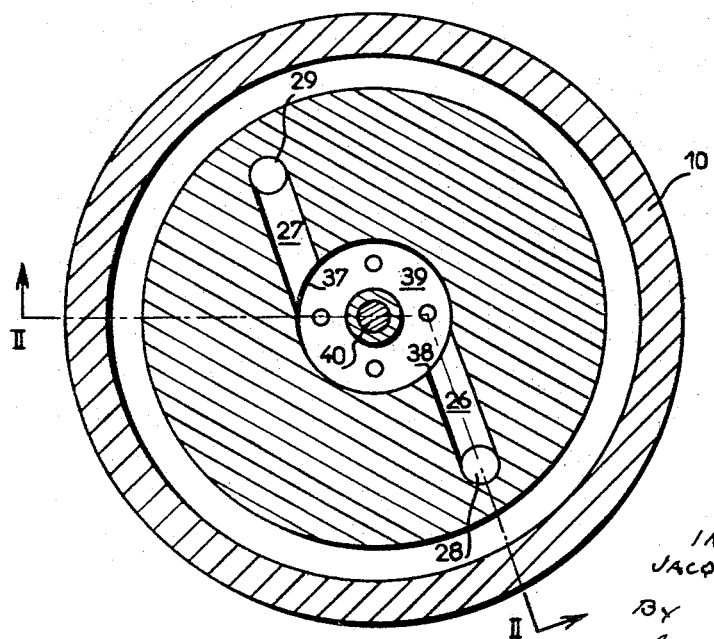

In the accompanying drawings in which are shown one or more of various possible embodiments of the several features of the invention, FIG. 1 is a longitudinal sectional view of a pressure vessel according to one embodiment of the invention, FIG. 2 is a view similar to FIG. 1 of another embodiment of the invention showing only the liquid port end of the pressure vessel and taken along line II—II of FIG. 3, FIG. 3 is a sectional view taken along line III—III of FIG. 2, FIG. 4 is a view similar to FIG. 2 of still another embodiment of the invention, and FIG. 5 is a diagrammatic view of a hydraulic system utilizing pressure vessels of the types shown in FIGS. 1 and 4.

Referring now to the drawings, in the illustrative embodiment shown, the pressure vessel is a pressure accumulator comprising a rigid container 10 substantially cylindrical along the major portion thereof, having an open mouth 11 and an axial opening 12 in its opposed end.

The mouth 11 is closed by means of a cover member 13 which fits into the cylindrical cavity of the container and is releasably retained in position as by a snap ring 14. The snap ring is positioned in an annular groove 14' in the wall of the container and protrudes therefrom, a gasket 15 encompassing the cover member providing a seal between the cover member and the container.

Positioned in the container is a deformable and expansible partition 17, illustratively a bladder of natural or synthetic rubber. The bladder which illustratively is substantially conical in longitudinal cross section, has a rounded closed end 17" and has an axial opening 17' at its opposed end. The bladder is securely retained in position by a fitting 19 which has an externally threaded stem 20 which protrudes through an axial opening 16 in cover member 13. The inner end 18 of the fitting 19 defines a flange that clamps the periphery of opening 17' of the bladder against the cover member when a nut 21 screwed on the protruding portion of stem 20 is tightened securely to retain the bladder in position. A cap 22 screwed on the end of stem 20 protects the conventional air valve (not shown) positioned in the bore 19' of the fitting 19.

The chamber 23 defined by the interior of the bladder 17 is adapted to be charged with gas under pressure forced through the bore 19' of fitting 19. The chamber 24 defined between the container 10 and the bladder 17 is adapted to be charged with a non-compressible fluid such as oil through the axial opening 12 of the container.

As shown in FIG. 1, the axial opening 12 is defined by a substantially cylindrical axial extension 25 which is of reduced inner diameter at its outer end defining an annular shoulder 30. Positioned in the bore 29 of the axial extension 25 is a cylindrical sleeve 31 which has its lower edge seated on shoulder 30, the sleeve being securely retained in position by a set screw 32.

The sleeve 31 has an opening or port 33 in the wall thereof which is aligned with a transverse port 28 in extension 25. The inner end of sleeve 31 mounts a concave disc 35 perforated as at 36. An oblique conduit or pipe 34 has one end in communication with port 33 and its other end positioned against the undersurface of perforated disc 35 at the central portion thereof. Thus, the pipe 34 defines a passageway 26 and a second passageway 27 is provided through the bore 29 of extension 25 and through the portion of sleeve 31 around the pipe 34.

To use the accumulator, the bladder 17 is first charged with air under pressure through bore 19' of fitting 19 until the bladder expands substantially to fill the interior of the container 10. Oil under pressure greater than that under which the bladder 17 was initially charged, is then forced through the bore 28 and through oblique pipe 34 and the portion of the perforated disc 35 with which the pipe communicates, into the chamber 24. As a result, the bladder will be compressed as will be the gas initially charged therein.

In order to use the charged accumulator, a valve (not shown) controlling the port 29 of the extension 25 is opened. As a result, the bladder 17 will expand and will force the oil from chamber 24 through the perforated disc 35 and through the passageway 27 in sleeve 31 and through bore 29.

During the transitional period when the pressure in the accumulator has dropped, due to expansion of the bladder to force oil out of port 29 to the hydraulic line, and the accumulator by reason of the pressure drop is having oil forced therein by a suitable pump, as there are two separate and distinct passageways, i.e., passageway 26 for charging and passageway 27 for discharging, there will be substantial separation of the fluids at the point of entry into and discharge from the chamber 24.

As a result, eddy currents will be eliminated and hence there will be no likelihood of cavitation in the hydraulic line.

In the embodiment shown in FIGS. 2 and 3, parts corresponding to those in FIG. 1 have the same reference numerals. In this embodiment, only the lower end of the accumulator differs from that shown in FIG. 1. Thus, the lower end of the accumulator is cylindrical and receives a plug 50 that is retained in position by a snap ring 51 which engages complementary annular grooves 52 in the wall of the container 10 and the periphery of the plug 50, a gasket 53 encompassing the plug 50 to define a seal.

The plug 50 has a concave inner surface 54 with an axial bore 55 which has a transverse wall 56 between its ends having passageways 57 therethrough and an axial sleeve 58 rising therefrom. The portion 39 of bore 55 between the wall 56 and the concave surface 54 of the plug is of enlarged diameter defining a cup.

Slidably mounted in the sleeve 58 and extending through wall 56 is a stem 40 which mounts a valve head 41 at its inner end designed to seat on the beveled mouth 43 of cup 39 when the container 10 has been emptied to prevent extrusion of the bladder 17. The valve head is normally urged to open position by a coil spring 42 encompassing the stem and compressed between the valve head and the wall 56, a nut 59 screwed on the free end of stem 40 limiting the movement of the valve head.

The outer end of bore 55 is closed by a threaded plug 61 and two separate and distinct passageways are provided for charging and discharging the chamber 24.

Thus, the plug 50 has two spaced bores 28 and 29 extending parallel to the axis of the container 10 and in communcation at their inner ends with oblique parallel passageways 26, 27 leading into the cup 39. As shown in FIG. 3, the outlet ends 38, 37 of passageways 26, 27 are positioned on opposite sides of the axis of the cup and the parallel passageways 26, 27 are so inclined that the fluids at their point of entry into and discharge out of the chamber 24 will flow on opposite sides of the valve stem 40 and hence be spaced from each other to prevent eddy current and cavitation.

In the embodiment shown in FIG. 4, the lower end of the container 10 of the pressure accumulator has a cavity, the upper portion of which is substantially cylindrical as at 62 defining an annular shoulder 63 and the lower portion 64 of which is substantially conical.

Positioned in the cylindrical portion 62 of the cavity and seated on shoulder 63 is a disc 65 which has a concave inner surface 66 with a cylindrical recess 39 defining a cup. The mouth of the cup is beveled as at 43 to define a valve seat and the floor 67 of the cup 39 has an axial sleeve 68 rising therefrom as well as a passageway 27 providing communication between chamber 24 and the conical portion 64 of the cavity.

Slidably mounted in the sleeve 68 and extending into the conical cavity 64 is a valve stem 40 which mounts a valve head 41 at its inner end designed to move against seat 43. The valve head 41 is normally urged to open position by a coil spring 42 encompassing the valve stem and compressed between the valve head 41 and the floor 67 of the cup, a nut 69 screwed on the end of the stem limiting outward movement thereof.

The lower end of the container has a transverse passageway 28 in communication with a transverse passageway 26 leading into the cup 39 and in addition a second transverse passageway 29 leads into the conical portion 64 of the cavity and hence is in communication with passageway 27.

Thus, with the construction shown in FIG. 4, fluid forced into the chamber 24 through passageway 28 will flow in a line on one side of the valve stem 40 and fluid discharged from chamber 24 through passageway 27 will flow in a line on the other side of the valve stem. As a result, the fluids at their point of entry into and discharge from chamber 24 will be spaced from each other thereby preventing eddy currents and cavitation.

In FIG. 5 is shown a hydraulic system utilizing two pressure vessels 10, 10', the former being of the type shown in FIG. 1, and the latter being of the type shown in FIG. 4, the pressure vessels illustratively being incorporated in a single casing 47.

As shown in FIG. 5, the passageway 27 of pressure vessel 10 is connected by line 29 to the inlet of a pump 46, the outlet of which is connected by line 28' to port 28 of pressure vessel 10'. The port 29" of pressure vessel 10' is connected by line 29' to one side of the hydraulic unit 45 to be actuated and the return side thereof is connected by line 28" to port 28 of pressure vessel 10.

With the system above described the pressure vessel 10' which is charged to a high pressure, feeds the hydraulic system 45 through line 29' and the fluid return from the hydraulic system 45 flows through line 28" into the pressure vessel 10 which is under a relatively low pressure but sufficient to maintain flow of oil to the pump 46 through line 29 to prevent cavitation thereof.

With the equipment and system above described, the pressure vessel may be charged with fluid under pressure when the pressure therein has dropped due to flow from the pressure vessels in use, without substantial mixing between the fluids simultaneously flowing into and out of the pressure vessels. As a result, eddy currents will be prevented thereby preventing cavitation in lines which would cause malfunctioning of the hydraulic equipment being actuated.

As many changes could be made in the above equipment and system, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A hydraulic system comprising two pressure vessels each comprising a container having a gas inlet port and a fluid port, a deformable partition in each of said containers intervening between said ports and defining a gas chamber and a liquid chamber on opposed sides thereof, each of said fluid ports comprising two spaced passageways both having their inner ends in communication with the associated liquid chamber, one of said passageways defining a fluid inlet and the other a fluid outlet, a hydraulic unit having an inlet and an outlet, a fluid pump having an inlet and an outlet, a line connecting the outlet of said pump to the fluid inlet of one of said pressure vessels, a line connecting the fluid outlet of said pressure vessel to the inlet of said hydraulic unit, a line connecting the outlet of said hydraulic unit to the fluid inlet of said other pressure vessel and a line connecting the fluid outlet of said other pressure vessel to the inlet of said pump.

2. The combination set forth in claim 1 in which the fluid inlet and fluid outlet of each of said pressure vessels provide flow in two spaced paths at the points of entry of fluid into and discharge of fluid from said passageways.

3. The combination set forth in claim 1 in which at least one of said pressure vessels has means mechanically to close the inlet ends of both of said passageways.

References Cited

FOREIGN PATENTS 785,454  10/1957  Great Britain.

LAVERNE D. GEIGER, *Primary Examiner.*

SAMUEL ROTHBERG, *Examiner.*

H. S. BELL, *Assistant Examiner.*